United States Patent [19]

Deconinck

[11] Patent Number: 4,463,943
[45] Date of Patent: Aug. 7, 1984

[54] DISPENSER FOR DISPENSING PHOTOGRAPHIC SHEETS FROM A STACK

[75] Inventor: Hugo F. Deconinck, Deurne-Zuid, Belgium

[73] Assignee: Agfa-Gevaert N.V., Mortsel, Belgium

[21] Appl. No.: 299,011

[22] Filed: Sep. 3, 1981

[30] Foreign Application Priority Data

Sep. 8, 1980 [GB] United Kingdom ................. 8028897

[51] Int. Cl.³ .............................................. B65H 3/06
[52] U.S. Cl. ....................................... 271/21; 271/22; 271/115; 271/118
[58] Field of Search ................................... 271/19–25, 271/114, 115, 118; 221/217, 259, 262

[56] References Cited

U.S. PATENT DOCUMENTS

| 492,218 | 2/1893 | Lux | 271/21 |
| 1,140,884 | 5/1915 | Dick | 271/22 |

FOREIGN PATENT DOCUMENTS

640941  1/1979  U.S.S.R. ................. 271/21

Primary Examiner—Bruce H. Stoner, Jr.
Assistant Examiner—James E. Barlow
Attorney, Agent, or Firm—William J. Daniel

[57] ABSTRACT

A dispenser for dispensing photographic sheets from a stack, comprising a dispensing mechanism with first and second sheet buckling members operative to make the upper sheet buckle and lift and then to release the leading edge of the buckled sheet to allow it to move under recovery forces of the sheet into a forward position beyond the end of the stack of sheets.

8 Claims, 14 Drawing Figures

DISPENSER FOR DISPENSING PHOTOGRAPHIC SHEETS FROM A STACK

The present invention relates to a dispenser suitable for dispensing photographic sheets one-by-one from a stack. The invention is more particularly concerned with a dispenser in the form of an unloader capable of unloading sheets from a stack containing holder so that the holder together with the contained sheets can be repeatedly transferred to an exposure station for exposing the upper sheet of the stack and then to the unloader for removal of that sheet and delivery thereof to a take-up station, e.g. for development of the exposed sheet.

The invention is particularly suitable for application in an unloader for a photographic sheet pack holder having an exposure opening on one side wherein sheet biasing means is provided for biasing the stack of sheets towards the exposure opening for the sheet pack, sheet retaining means are provided along the periphery of the exposure opening for retaining the biased sheets within the holder, and wherein the sheet retaining means are interrupted at two locations that are situated opposite to each other on parallel side-walls of the sheet holder so that the upper sheet may be uni-directionally buckled with a view toward its removal after exposure. A sheet holder of the described type is disclosed in our co-pending application Ser. No. 299,012 entitled: "A container suitable for holding a stack of photographic sheets" filed on even day herewith, now U.S. Pat. No. 4,388,992.

A dispenser for dispening sheets from a stack of sheets is known, which comprises a dispensing mechanism with means for frictionally engaging the top sheet which is next to be dispensed from the stack and exerting on such sheet forces causing buckling of a portion of the sheet, and for feeding the forward end of the sheet upon release of the buckle over a guide such that said sheet end becomes separated from the stack. A dispenser of the described type is disclosed in U.S. Pat. No. 3,989,237. This known dispenser has the disadvantage that the construction of the means for frictionnaly engaging the upper sheet of the stack is rather complicated, and also that the forward feeding of a separation sheet occurs from the plane of he upper sheet whereby difficulties may arise from the dispensing of the sheet sufficiently vertically away from the underlying sheet.

It is the aim of the present invention to provide an improved sheet dispensing mechanism that is simple and reliable of construction, and that is capable of producing in the upper sheet of a stack a buckle to such a magnitude that recovery forces are induced in the sheet that are so great that one end of the sheet may, upon its release, rapidly and controlled by jump away thereby to reach beyond the boundary of the stack of sheets, and also well above the level of the sheets.

In accordance with the present invention, a dispenser for dispensing photographic sheets from a stack, said dispenser having a stack-receiving and locating unit and a dispensing mechanism which comprises means for frictionally engaging the next sheet to be dispensed from the stack and exerting on such sheet forces causing buckling of a portion thereof and separation of an end of the sheet after release of the buckle, and having means for engaging that end of the sheet and for feeding it from the stack, is characterized thereby that the said dispensing mechanism comprises a first sheet buckling member which operates to cause buckling of the sheet by advancing one end (hereafter called "trailing end") of the sheet towards it opposite end (hereafter called "leading end"), and a second sheet buckling member which then operates to increase the buckling force on the sheet by displacing the leading end towards the advanced trailing end of the sheet, and in that the second buckling member operates to lift and then release said leading edge of the sheet to allow it to move under elastic recovery forces in the sheet into a forward position projecting beyond the leading end of the stack; and in that the feed means is located for receiving that leading edge of the sheet when in its projected position.

The terms "leading" and "trailing" denote physical positions of the sheet in relation to the direction of dispensing of the sheet from the stack of sheets.

The sheet buckling members may be in the form of rods, strips, pods or the like that have a coefficient of friction with respect to the surface of a sheet to be engaged that exceeds the coefficient of friction between successive sheets.

According to a suitable embodiment of the invention, the second sheet feeding means is arranged in such a way that it can be brought in close proximity of the upper sheet of the sheet stack but not into actual contact with said sheet while in unbuckled condition, and the control of the operations of the first and second feed means is such that the first sheet engaging means starts to operate and thus forms a buckle in the upper sheet after the second sheet engaging has taken its position in close proximity of the sheet, and that the second sheet engaging means becomes operative only after the first means has produced a buckle in the sheet to an extent sufficient to bring the sheet into frictional engagement with the second means. The advantage of this arrangement is that the second sheet engaging means may be manipulated according to a simple bodily swinging movement, whereby control of the operation of both engaging means may be very simple, as will appear from the complete description of said embodiment further in this specification.

According to a further interestering embodiment of the invention, a sheet releasing element may be associated with the engaging second means that has a coefficient of friction that is notably less than the coefficient of friction of the engaging means itself, the element being arranged in such a way that at the end of the second displacement of the sheet portion by the sheet engaging means, the contact of the sheet with the second means is suddenly broken and replaced by a contact with the sheet releasing element.

The dispenser according to the invention may be arranged for receiving the stack of sheets in the form of a sheet pack, as mentioned already in the introduction of the specification, whereby repeated insertion and removal of the stack of sheets from the dispenser, in order to remove each time one sheet from the stack, may occur most easily.

The dispenser may further be arranged for receiving such sheet pack while the sheet pack is fitted in a pack holder having a dark slide. By this means, the sheet pack may be light-tightly inserted into and withdrawn from the dispenser in day-light conditions. The pack holder may also form an adapter for the proper positioning of the sheet pack in a photographic camera. Finally, the sheet pack may be integral with the pack holder.

The invention will hereinafter be described by way of example with reference to the accompanying drawings wherein.

Figure 1:
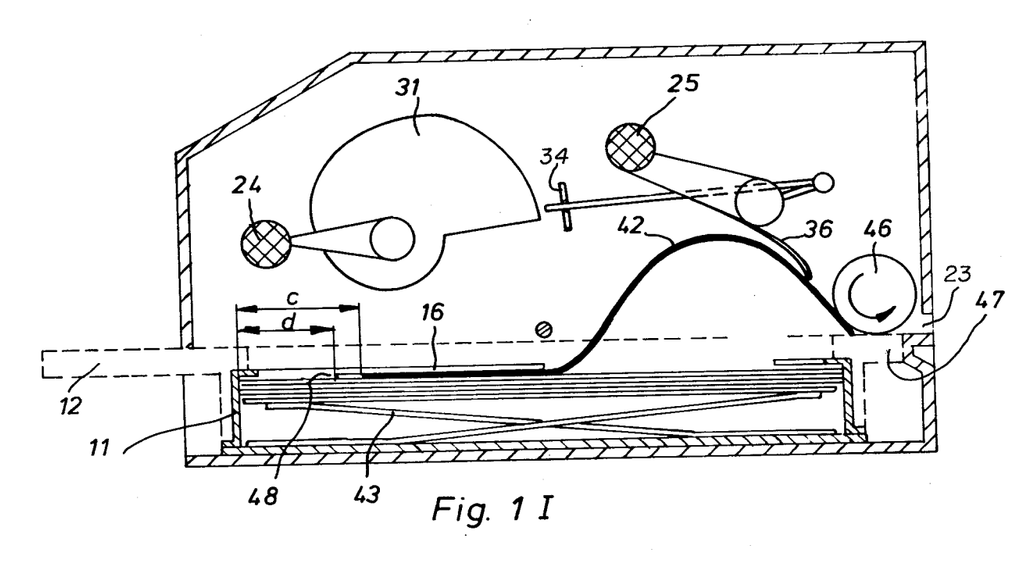
FIGS. 1A and 1J are diagrammatic illustrations of one embodiment of a dispenser according to the invention, at successive operational positions relative to on a sheet pack.
Figure 1A:
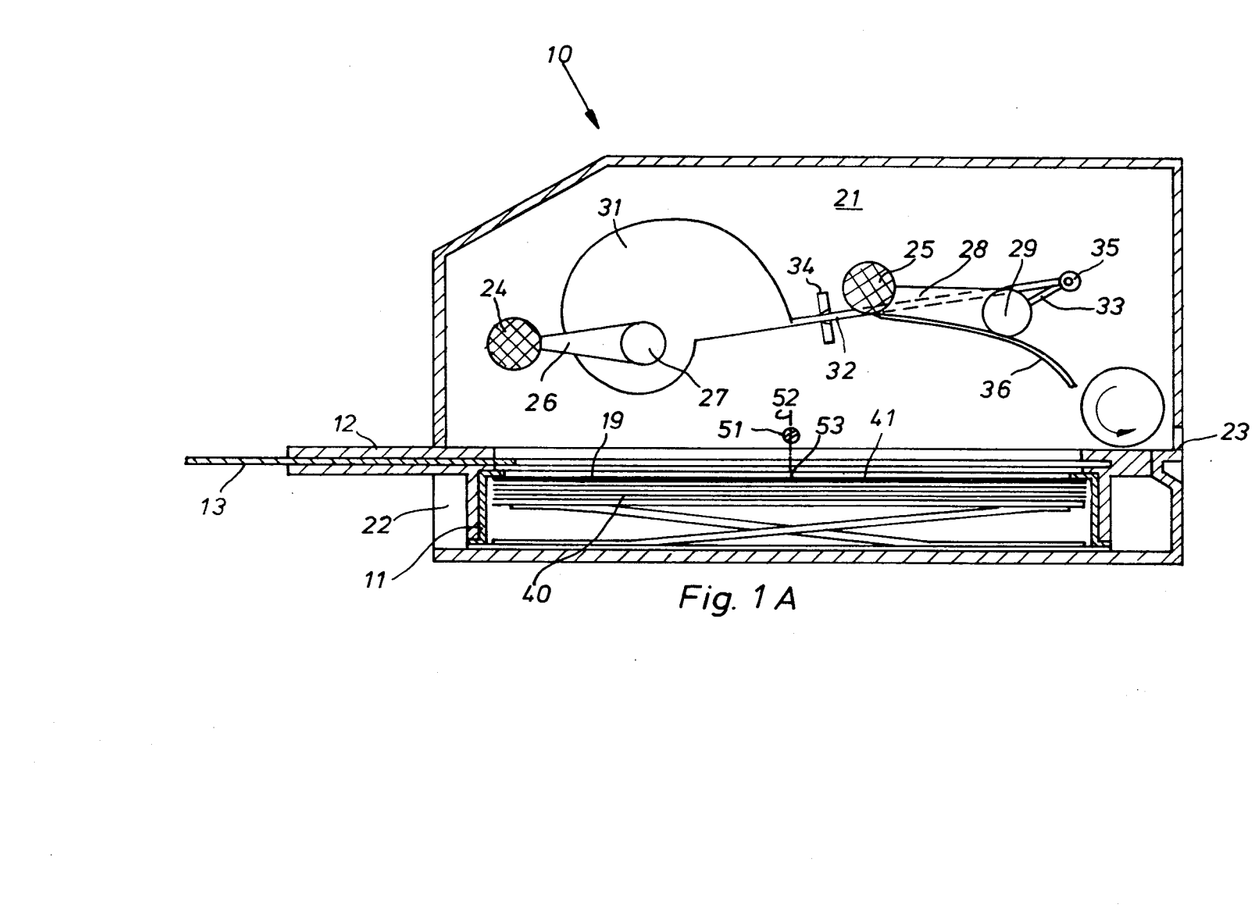

Referring to FIG. 1A, the dispenser 10 is arranged for light-tightly unloading a photographic sheet pack 11 that is fitted into a pack holder 12. The pack holder is provided with a dark slide 13 for the light-tight shielding of the contents of the sheet pack during the transport of the pack from a camera to the unloader.

More details of the particular sheet pack that is used in the present dispenser are set forth with reference to FIGS. 2 and 3.

To avoid encumbering of the figures, the pack holder 12 has been illustrated in FIG. 1A in cross-section. In FIGS. 1B to 1J the pack holder has been illustrated in broken lines to better illustrate the several operative positions of the unloading machanism.

Further, in order to clarify the figures, the upper sheet of the stack of sheets has been drawn in a heavy line.

The dispenser comprises a light-tight housing 21 with an inlet opening 22 for introduction of the sheet pack and an outlet opening 23 for a sheet withdrawn from the pack.

The dispensing mechanism comprises two sheet feeding means in the form of friction members 24 and 25. The friction members may be made from rubber or from a resilient or foamed plastic with a coefficient of friction with respect to the upper surface of the sheet of the pack that is greater than the mutual friction between adjacent sheets. The friction members may have a length that covers an area of approximately one third to two thirds of the corresponding width of the exposure opening of the sheet pack, and their axes may run parallel with the plane of the sheet pack.

The member 24 is fitted to an arm 26 that may be rotated by a shaft 27. The member 25 is fitted to an arm 28 that projects from a rocker shaft 29.

Rotation of the shaft 27 in the direction of the arrow 37 may occur by motor means, not shown.

The rocking movement of the shaft 29 may be controlled by a cam 31 fitted to the shaft 27, through the intermediary of levers 32 and 33. The lever 32 may freely slide and pivot in a guide 34. The lever 33 is rigidly fitted to the shaft 29, and pivotally linked to the lever 32 at 35.

A slightly curved plate 36 is fitted in place between friction member 25 and the shaft 29 and extends in the direction of the outlet of the dispenser. It performs the functions of breaking the contents of the buckled sheet from the friction member 25 at the correct moment, and of properly guiding the sheet thereafter, as will further be described.

With the dispenser in the inoperative position as shown in FIG. 1A, the dispensing cycle is started by rotation of the shaft 27.

Figure 1B:
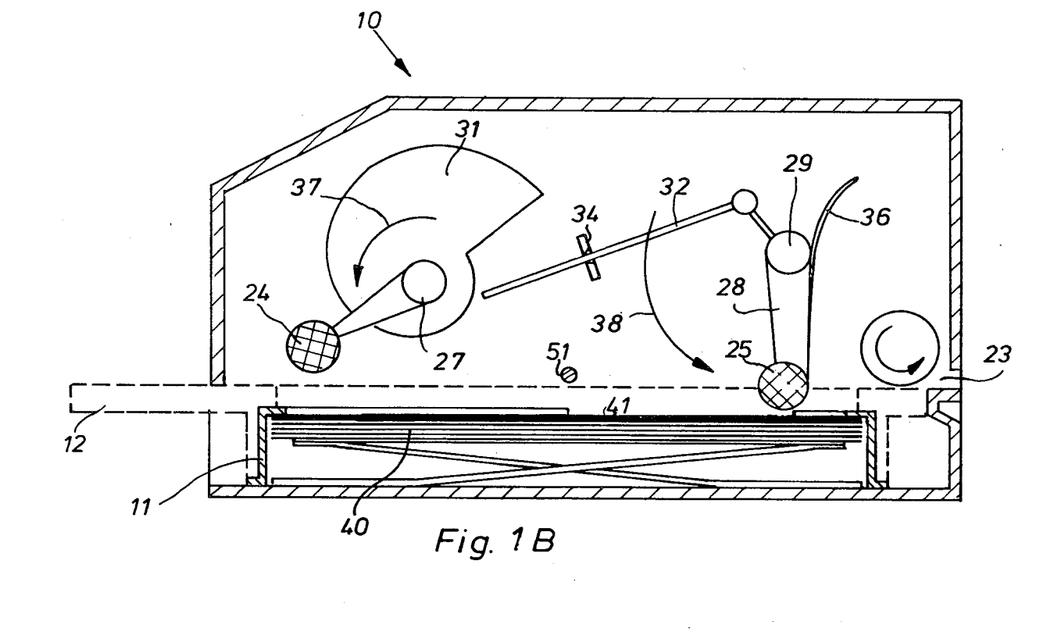

Referring to FIG. 1B, it may be seen that a small angular displacement of the cam 31 in the direction of the arrow 37 releases the lever 32 whereby the friction member 25 may fall down as indicated by the arrow 38.

The friction member 25 may slightly contact the upper sheet 41 of the sheet pack, but most preferably the friction member moves into close proximity to, but separated from the upper sheet. In this way, undesirable biasing of the upper sheet in a direction away from its centre, is avoided.

Further rotation of the shaft 27 brings friction member 24 into contact with the upper sheet 41 adjacent one of its ends, whereby the sheet stack is slightly depressed and its end portion (i.e. that trailing end portion) that is engaged by the friction member is displaced in the direction towards the opposite sheet end portion (the leading end) whereby compression forces are created in the sheet that cause it to buckle at the place where the sheet is free to do so, namely at the interruption 14 (see FIG. 1C) of the sheet retaining means of the sheet pack. The sheet buckle 42 is further increased in size upon continued movement of the member 24, until a sheet buckle as illustrated in FIG. 1D is obtained as the contact between the friction member 24 and the sheet is broken.

Figure 1C:
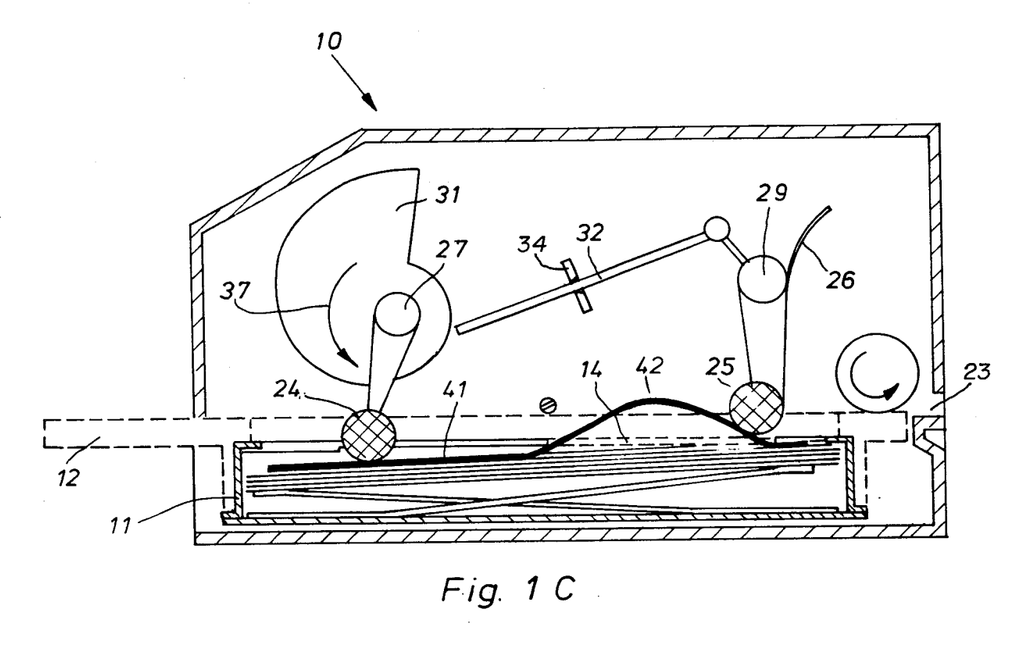
Figure 1D:
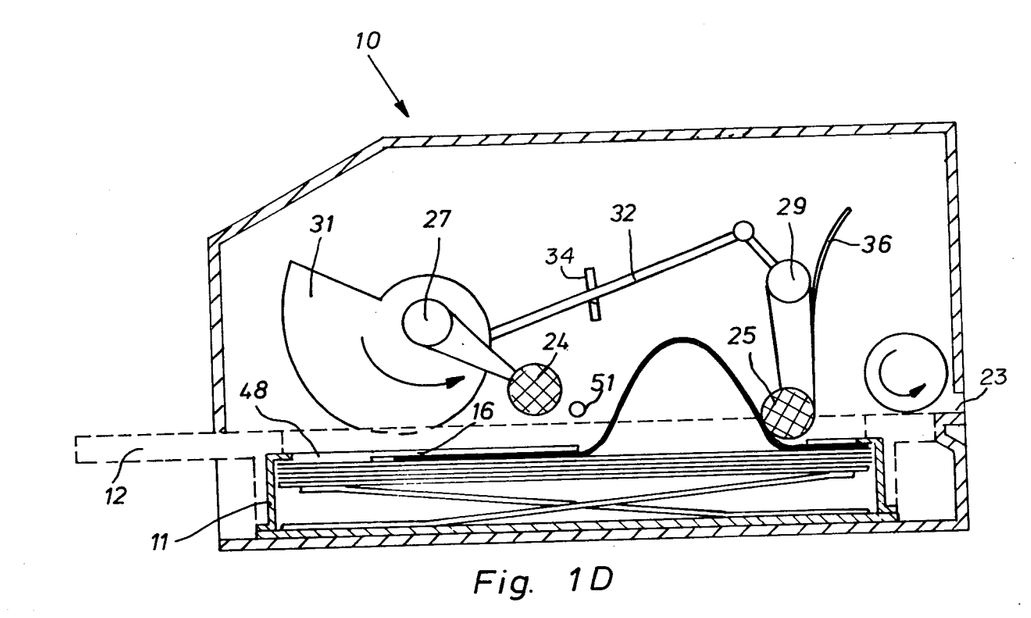
Figure 1E:
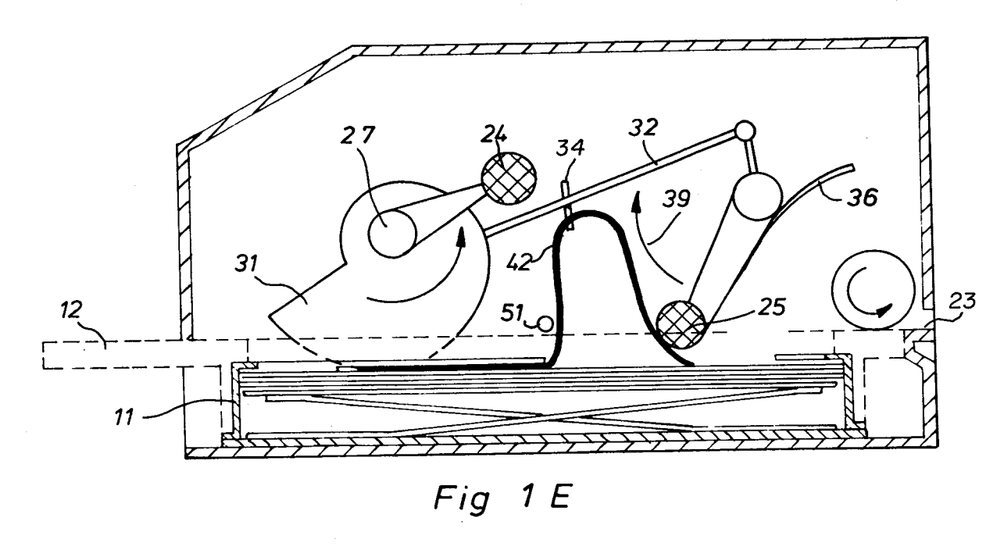
Figure 1F:
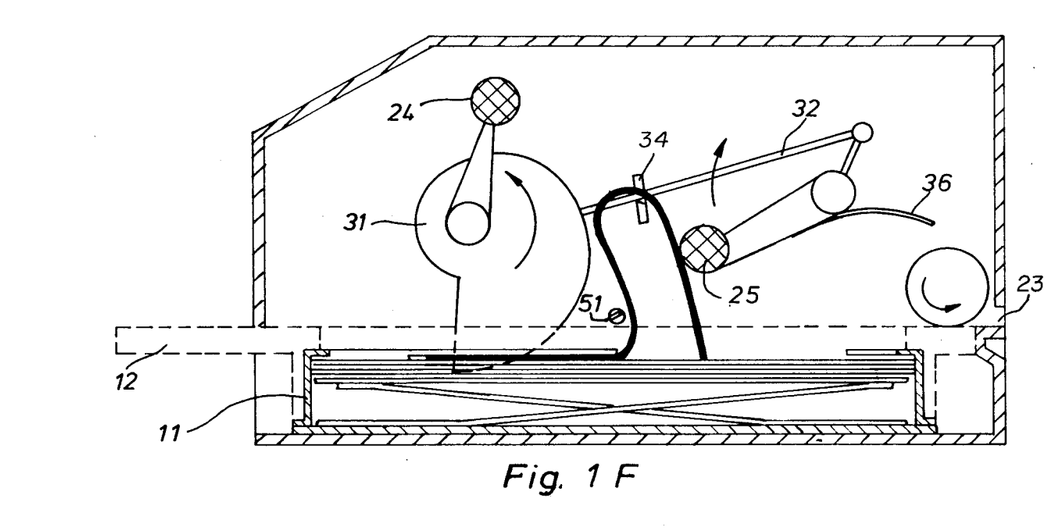

Further rotation of the shaft 27 now causes the cam 31 to engage the lever 32 and push it to the right whereby the friction member 25 is swung backwardly in the direction of the arrow 39, see FIG. 1E. Thus, although the friction member 25 did not engage the upper sheet in its initial operative position as shown in FIG. 1B, it is clear that frictional contact with the sheet was established with the formation of the sheet buckle 42, see FIG. 1C, and for that reason the friction member 25 will displace the other or opposite sheet end portion engaged thereby during its upward displacements, see FIGS. 1E, 1F, and 1G.

Figure 1G:
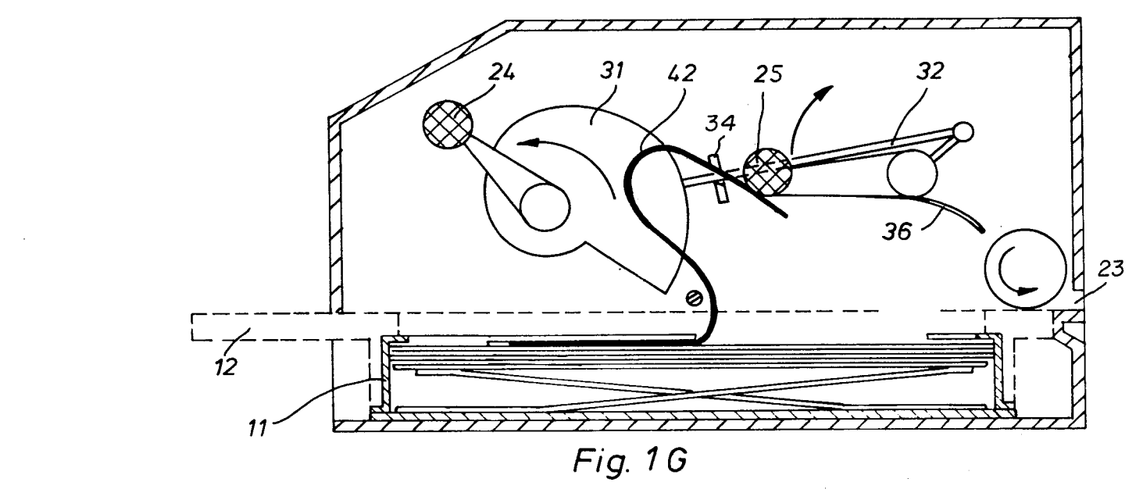
Figure 1H:
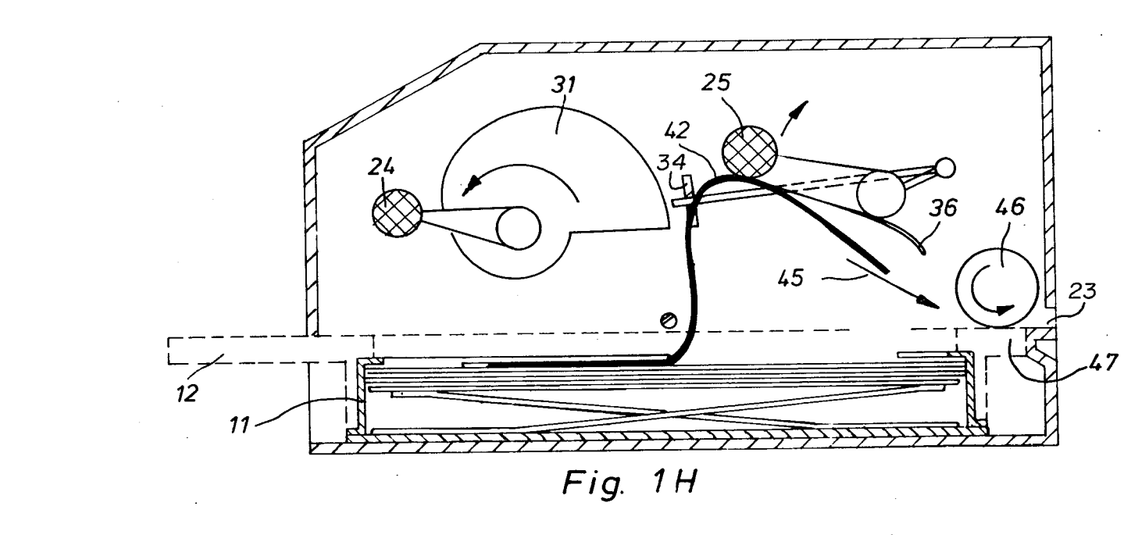

Further displacement of the friction member 25 causes the withdrawn opposite end portion of the upper sheet 41 to contact the guide plate 36 as shown in FIG. 1H. This plate takes over the contact of the sheet from the friction member 25, and since the coefficient of friction of the plate with respect to the sheet is very small, the free sheet end immediately begins to slide forward along the plate end as illustrated by the arrow 45. A suitable material to be used for the guide plate 36 is polished stainless steel. The coefficient of friction of the plate 36 with respect to the sheet may be further reduced by providing the concave side of the plate 36 with a suitable low friction coating, e.g. with a coating of Teflon (registered trade-mark).

The curved lower end of guide plate deflects the advancing sheet end towards the driving nip formed by the transport roller 46 and the corresponding portion 47 of the frame of the sheet holder 12, see FIG. 1I, so that this sheet end is firmly gripped and removed from the sheet pack, see FIG. 1J. The frictional force between the roller 46 and the sheet must exceed the friction between the sheet and the corresponding wall 47 of the pack holder 12.

This effect may be obtained in two ways; first, by selecting for the roller 46 a material with a high friction coefficient, for instance rubber, and second, by giving the co-operating surface of the sheet pack a low coefficient of friction, for instance by providing that surface with a strip of self-adhesive tape of Teflon (registered trade-mark) or the like.

The gripping of the transport sheet by the roller 46 is made possible in fact by the longitudinal displacement of the sheet over a distance c as indicated in FIG. 1I. Such displacement was produced by the action of the friction member 24, and it is only due to this displacement that the sheet may extend at its withdrawn leading end beyond the limit of the exposure opening of the sheet pack, and become positioned on the upper surface of the corresponding side of the sheet pack after the release of the sheet buckle.

The occasional return, i.e., slipping back, of the forwardly pushed trailing end of the sheet by the friction member 24 may be avoided, and the complete removal of the sheet from the sheet pack may be facilitated, if the sheet retaining means 16 of the sheet pack is provided at the inner side of the sheet pack with a step such as the step 48 illustrated in FIG. 1I.

Referring to FIGS. 1B and 1C, the friction member 24 operates to push the trailing end portion of the upper sheet forwardly over a distance c as indicated in FIG. 1I. If said distance is equal to or greater than the length d of the described step, then it is clear that the sheet, which due to its elasticity may tend to return to its initial position, abuts with its trailing edge against said step 48 whereby the intended longitudinal displacement of the sheet is maintained.

The facilitation of the removal of the sheet is based on the height e of the step 48 as illustrated in FIG. 1J. If this height is equal to or greater than the thickness of one sheet, then it is clear that once the trailing end of the top sheet moves past the step 48 this step relieves to a considerably extent the upper sheet of the bias of the spring biasing means 43 in the sheet pack, so that the upper sheet may be withdrawn with less friction from the pack. The features of the described step as set forth in detail in our co-pending Application entitled: "A container suitable for holding a stack of photographic sheets", mentioned already on page 1 of the specification.

A type of sheet pack which is particularly suited to be unloaded by the dispenser according to the invention, as well as the use of said pack, are explained in detail hereinafter with reference to FIGS. 2 and 3.

Figure 2:
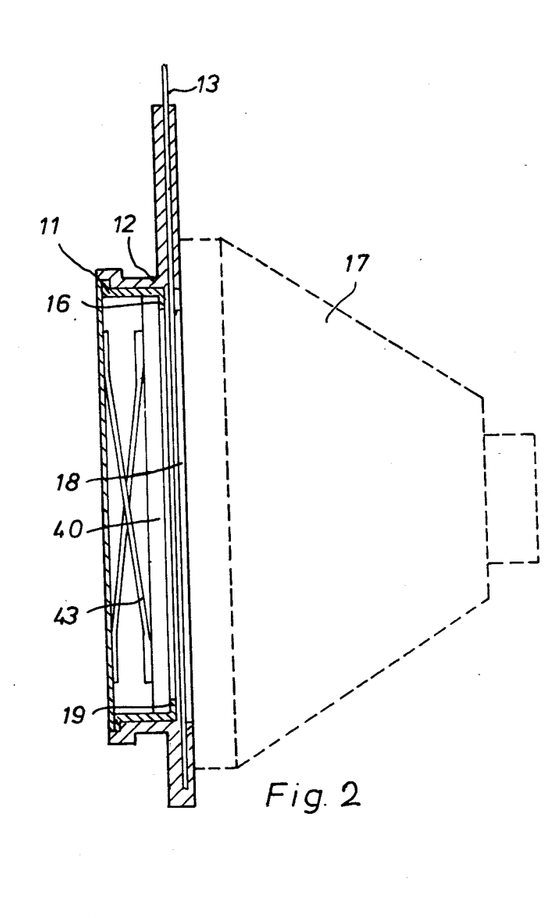
FIG. 2 illustrates a preferred type of sheet pack that may be unloaded by the dispenser according to FIGS. 1A to 1J, in the exposure position.
Figure 3:
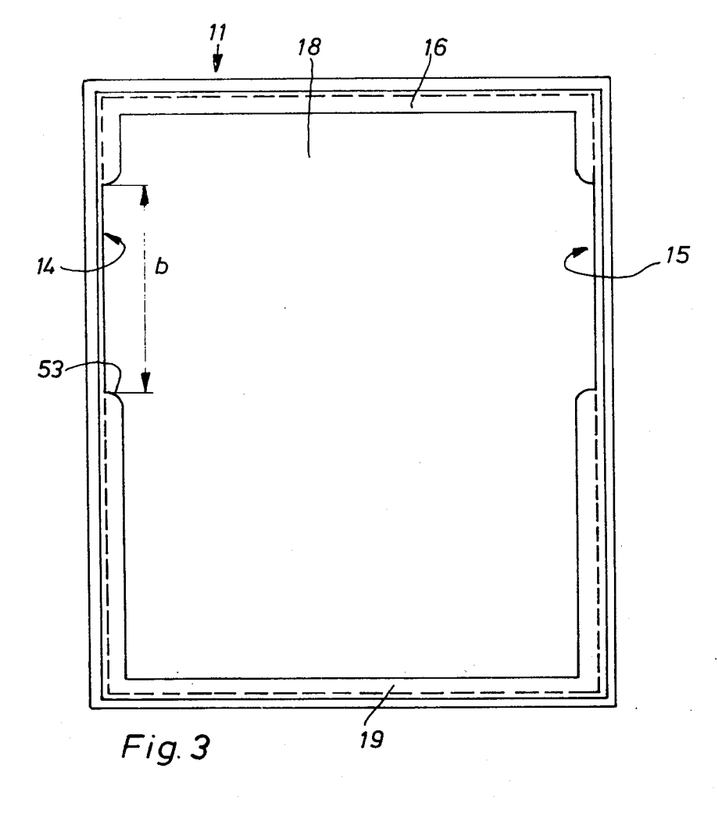
FIG. 3 is a plan view of the sheet pack.

Referring to FIG. 2, the rectangular sheet pack 11 is light-tightly inserted into the corresponding opening of a pack holder 12 that is arranged for attachment to the rear-side of a photographic camera 17, illustrated in broken lines. The sheet pack 11 may be arranged for clampingly fitting in the holder 12, but the pack 11 may also be provided with springlike fingers, pivotal clips or the like, for securing the pack in the holder.

The camera 17 may be a professional or semi-professional-type camera for making passport photographs, studio exposures for the production of lay-outs, etc. The dark slide 13 of the pack holder is withdrawn from the exposure opening of the sheet pack as a sheet exposure is to be made, and the closing of the slide permits the removal of the pack holder with the sheet pack from the camera under daylight conditions, after an exposure has been made, and the transfer thereof to an unloader for removal of the exposed upper sheet of the pack.

The sheet pack 11 comprises a stack 40 of sheets that are biased by spring means 43 in the direction of the rectangular exposure opening 18 of the pack. The sheets are retained in the holder by sheet retaining means in the form of inwardly projecting peripheral flange 16 and 19 that have a U-shaped form, with the openings of the U's facing each other. The distance between the opposite extremities of the legs of the U's 35 and 36 is indicated by b, see FIG. 3, the outline of the sheets being indicated by broken lines. The distance b defines an interruption of the peripheral retaining flange for the sheet material. The interruptions have been indicated by the numerals 14 and 15, and they provide the space that is required for each buckling of the upper sheet of the stack of sheets.

The dispenser may include an anti-buckling member 51 (see FIG. 1A) in the form of a rod or the like that extends in close proximity over the opening of the sheet pack, in a position which coincides approximately, as indicated by the vertical dash and dot line 52, with the end 53 of the sheet retaining means 19 of the sheet pack.

The operation of the anti-buckling member 51 is as follows. At the instant the buckle 42 in the upper sheet has been completed, that is at the cross-over of the sheet position from FIG. 1C to FIG. 1D, it may occur that the sheet does not buckle uni-directionally as illustrated, i.e. transversely with respect to the dispenser, but that the sheet buckles also in a direction which is normal or almost normal thereto, i.e. longitudinally with respect to the apparatus. Such additional buckling formation impedes or prevents the desired transverse buckling of the sheet. It has been found that a member formed as the rod 51 that extends closely over the sheet surface, transversely of the sheet pack at a position as illustrated, i.e. about half-way the length of the sheet pack, preferably situated in line with the end of the interruption in the sheet retaining means, that is as indicated by the line 52 in FIG. 1A, effectively prevents the formation of undesired sheet buckles. If such undesired buckle tends to develop, as during the change-over of the sheet position from FIG. 1C to FIG. 1D where the central zone of the sheet alone may tend to buckle upwardly, suchlike buckle formation is stopped at the contact of the sheet with the rod 51. Further growth of the buckle 42 causes the first, undesired buckle to collapse.

The dispenser according to the invention may be provided with a supplemental sheet guiding plate that reaches closely over the end portion of the sheet pack that is leading according to the direction of insertion of the pack in the dispenser, and that extends within the exposure opening of the sheet pack over a distance smaller than the distance over which the first sheet engaging means displaces the corresponding sheet end portion in its own plane. Thereby it may be prevented that the leading end of a sheet withdrawn from the exposure opening of the sheet pack, should ever abut against the border of this opening rather than moving above it as illustrated in FIG. 1I.

Figure 4:
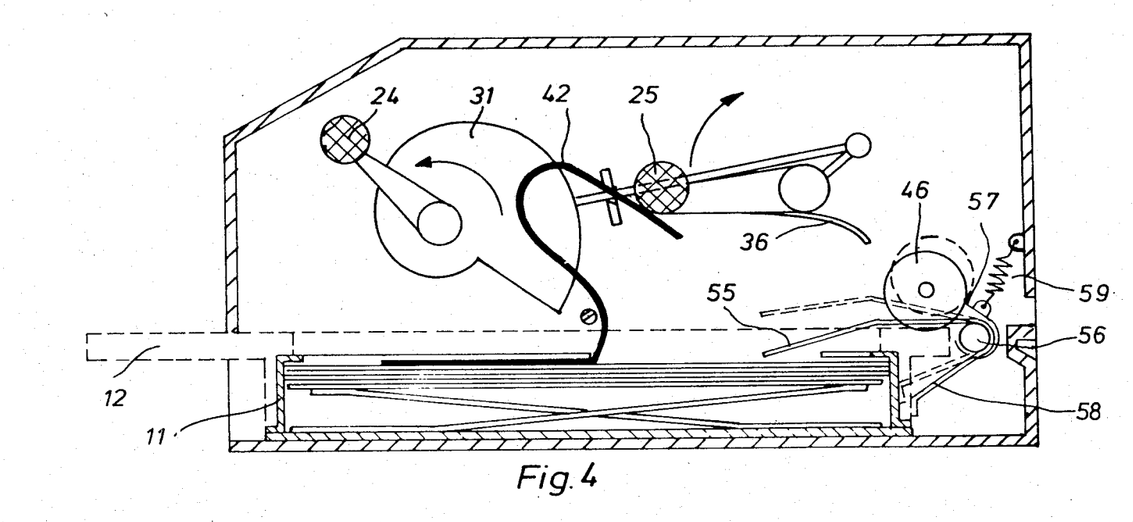
FIG. 4 is a modified embodiment of FIG. 1H.

Referring to FIG. 4 which is a modified embodiment of FIG. 1H, a supplemental plate 55 that has a slightly angled form and that is fitted to a pivotal shaft 56 is shown in solid lines in operative position. The transport roller 46 is journalled between two parallel arms such as 57 that are also fitted to the shaft 56. A lever 58 controls the operation of the shaft. In the inoperative position, when no pack holder has been inserted into the dispenser, the co-operating elements take the positions as diagrammatically illustrated in broken lines. Tension spring means such as 59 ensures this position.

As a pack holder 12 is inserted into the dispenser, the leading side-wall of the holder abuts against the lever 58 and causes thereby a rotation of shaft 56 whereby the guide plate 55 and the roller 46 are swung from a position in which they do not interfere with the final location of the pack holder to its operative position. The length over which the guide plate projects into the exposure opening of the sheet pack is smaller than the distance over which the second sheet engaging means 25 displaces the sheet in its own plane. Thus, the guide plate does not interfere with the withdrawal of the leading end of the upper sheet from the sheet pack.

Figure 5:
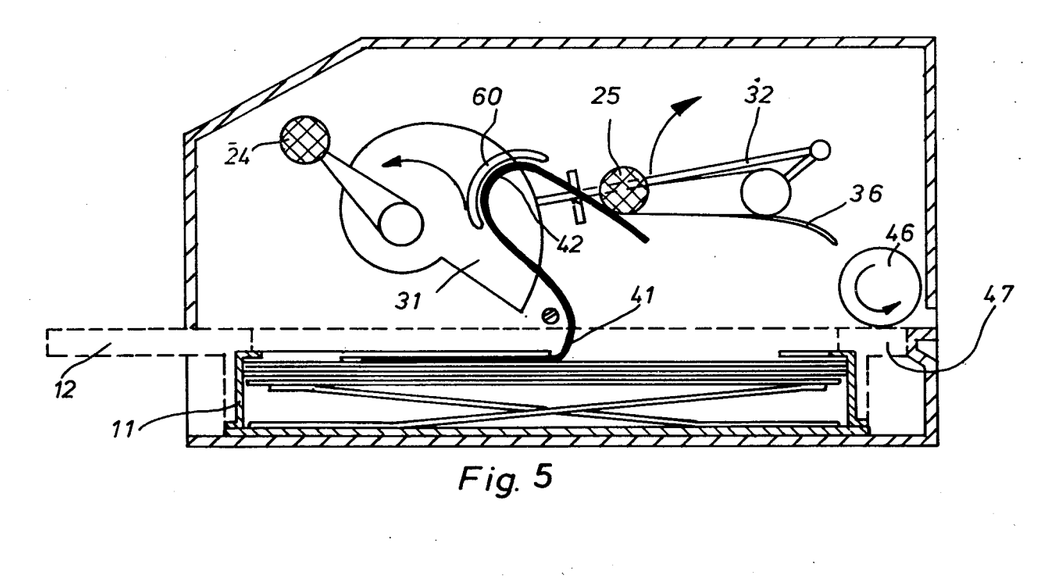
FIG. 5 is a modified construction of the embodiment of FIG. 1G.

The first function of the main guide plate 36 as described with reference to FIG. 1H, namely to limit the further buckling of the sheet by ending contact of the sheet loading end with the friction member 25, may be suitably supplemented by a sheet buckle restraining plate 60, see FIG. 5 which is a modified version of FIG. 1G. The plate 60 is concavely curved to present a form that corresponds approximately with the curvature of the acutely buckled sheet. The plate 60 effectively blocks further rearward displacement of the sheet buckle 42, so that a few instants later, when the friction means 25 has reached a position that corresponds with the position illustrated in FIG. 1H, the sheet is released from the friction means 25.

The sheet of photographic material that has been removed by the dispenser may be conveyed to a photographic processing apparatus for developing an image in the exposed sheet.

In the description of the embodiment of the dispenser, reference has been made to a photographic sheet pack that was fitted in a pack holder. Such pack holder was moreover provided with a dark slide to enable the daylight operation of the dispenser. It will be understood that the dispenser may be also arranged for receiving sheet packs that are not fitted in a pack holder. Also, the dispenser may be arranged for receiving sheet packs that are integral with a pack holder.

Finally, the dispenser according to the present invention may be arranged for dispensing sheets of different formats. To that end, a number of modules may be provided of equal outer dimensions, that may interchangeably fit in the dispenser, at the place of the pack holder 12 illustrated in the drawings. Each module may have an inlet opening that matches with a corresponding size of sheet formats, so that the fitting of a particular module in the dispenser is readily adapted to receive the corresponding pack format.

In case the differences in sheet formats become too large, the sheet dispensing mechanism of the apparatus may be arranged for taking different longitudinal or transverse positions, thereby to occupy the correct position with respect to the sheets to be dispensed.

The dispenser according to the invention may be used for unloading film as well as paper sheets from the appropriate sheet packs. Selection of the characteristics of the several sheet dispensing means will depend on the stiffness, the mutual friction, the biasing of the sheets, etc.

We claim:

1. A dispenser for dispensing photographic sheets one-by-one from a stack, said dispenser having a stack-receiving and locating means, a dispensing mechanism for frictionally engaging the next sheet to be dispensed from the top of the stack and applying to such sheet forces causing buckling of a portion thereof leading to eventual separation of an end of the sheet from the stack, and sheet transport means for engaging the thus-released end of the sheet and withdrawing it from the stack, said dispensing mechanism comprises a first sheet buckling means operative to frictionally engage one end portion of the sheet to be dispensed and advance the same toward the opposite sheet end portion to create a generally transversely-directed buckle in said sheet between its end portions, a second sheet buckling means movable between an inoperative out-of-the-way position and an operative position adapted to frictionally engage the opposite end portion of the buckled sheet, and means for moving said second buckling means along a path leading to said inoperative position that is generally inclined inwardly toward said first sheet end portion and upwardly away from the stack top to displace the opposite sheet end portion engaged by said second buckling means generally along said path to increase the extent and acuteness of the buckle curvature, said second buckling means including a sheet releasing surface on its side facing generally away from said first buckling means when in said operative position, said releasing surface having a coefficient of friction substantially smaller than the coefficient of friction of said buckling means and taking over contact with said opposite end portion generally when said second buckling means reaches the inner end of its inclined path, whereby the upwardly and inwardly displaced end portion springs forwardly under the elastic recovery forces in said sheets to project the opposite sheet end portion forwardly of the corresponding end of the stack, and said transport means is located to receive the thus projected opposite end portion.

2. The dispenser of claim 1, wherein said second sheet buckling means in its operative position is in close spaced relation to the stack top and is contacted by the opposite end portion when in buckled condition and including means for operating said first sheet buckling means in timed relation to the movement of said second sheet buckling means whereby the latter is in its operative position in advance of operation of the former.

3. The dispenser of claim 1, wherein said surface is extended above said second buckling means and stretches generally horizontally when said opposite end portion makes contact therewith.

4. Dispenser according to claim 3, wherein said sheet releasing surface is in the form of a smooth plate.

5. Dispenser according to claim 4, wherein said plate is curved downwardly adjacent the end thereof remote from said second buckling means to direct the sheet towards the sheet transport means.

6. Dispenser according to claim 5, wherein said sheet transport means is in the form of a driven roller that together with an adjacent wall of the stack locating means determines a drive nip operating to transport the forwardly projecting sheet outside the dispenser.

7. Dispenser according to claim 1, including an anti-buckling member to prevent buckling of the upper sheet in a direction that is parallel to the direction of sheet withdrawal, said anti-buckling member being formed by rod means that extends in close proximity across the upper sheet of the sheet stack in a direction transverse with respect to the withdrawal direction.

8. Dispenser according to claim 1, wherein the stack of sheets is arranged in the form of a sheet pack.

* * * * *